(12) United States Patent
Mayo

(10) Patent No.: US 9,153,998 B2
(45) Date of Patent: Oct. 6, 2015

(54) WIRELESS POWER ORTHOGONAL POLARIZATION ANTENNA ARRAY

(71) Applicant: QUALCOMM Incorporated, San Diego, CA (US)

(72) Inventor: Gabriel Isaac Mayo, North Potomac, MD (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/094,322

(22) Filed: Dec. 2, 2013

(65) Prior Publication Data

US 2015/0155737 A1 Jun. 4, 2015

(51) Int. Cl.
| | |
|---|---|
| *H02J 7/00* | (2006.01) |
| *H02J 7/02* | (2006.01) |
| *H02J 5/00* | (2006.01) |
| *H04B 5/00* | (2006.01) |

(52) U.S. Cl.
CPC ............... *H02J 7/025* (2013.01); *H02J 5/005* (2013.01); *H02J 7/0052* (2013.01); *H04B 5/0037* (2013.01); *H04B 5/0075* (2013.01); *H04B 5/0081* (2013.01)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| | | | | |
|---|---|---|---|---|
| 5,634,199 | A * | 5/1997 | Gerlach et al. ............... | 455/63.1 |
| 6,094,165 | A * | 7/2000 | Smith ........................... | 342/373 |
| 6,137,785 | A * | 10/2000 | Bar-Ness ....................... | 370/328 |
| 6,285,097 | B1 * | 9/2001 | Hazelton et al. ........... | 310/12.06 |
| 7,813,766 | B1 * | 10/2010 | Lam ........................... | 455/562.1 |
| 7,872,445 | B2 | 1/2011 | Hui | |
| 8,248,026 | B2 | 8/2012 | Sip | |
| 2007/0008236 | A1 * | 1/2007 | Tillery et al. ................. | 343/797 |
| 2007/0145830 | A1 | 6/2007 | Lee et al. | |
| 2010/0001914 | A1 * | 1/2010 | Lavedas ........................ | 343/742 |
| 2011/0115432 | A1 | 5/2011 | El-Maleh et al. | |
| 2011/0279226 | A1 | 11/2011 | Chen et al. | |
| 2012/0326658 | A1 | 12/2012 | Kim et al. | |
| 2012/0329405 | A1 | 12/2012 | Lee et al. | |

FOREIGN PATENT DOCUMENTS

| | | |
|---|---|---|
| EP | 2466716 A2 | 6/2012 |
| WO | WO-2011145953 A1 | 11/2011 |

OTHER PUBLICATIONS

International Search Report and Written Opinion—PCT/US2014/065266—ISA/EPO—Feb. 10, 2015.

\* cited by examiner

*Primary Examiner* — Arun Williams
(74) *Attorney, Agent, or Firm* — Knobbe Martens Olson & Bear LLP

(57) ABSTRACT

Systems and methods for wireless power transmission are described herein. In one aspect, an apparatus for wireless power transmission comprises a first antenna array of antenna coils configured to generate a first wireless field. A second antenna array of antenna coils generates a second wireless field. The first antenna array at least partially overlaps the second antenna array. A driver circuit generates first and second drive signals for generation of the first and second wireless fields via the first and second antenna arrays, respectively. The first wireless field is orthogonal with respect to the second wireless field. The first antenna array and the driver circuit power the antenna coils of the first antenna array with alternating polarities. The second antenna array and the driver circuit power the antenna coils of the second antenna array with alternating polarities.

20 Claims, 8 Drawing Sheets

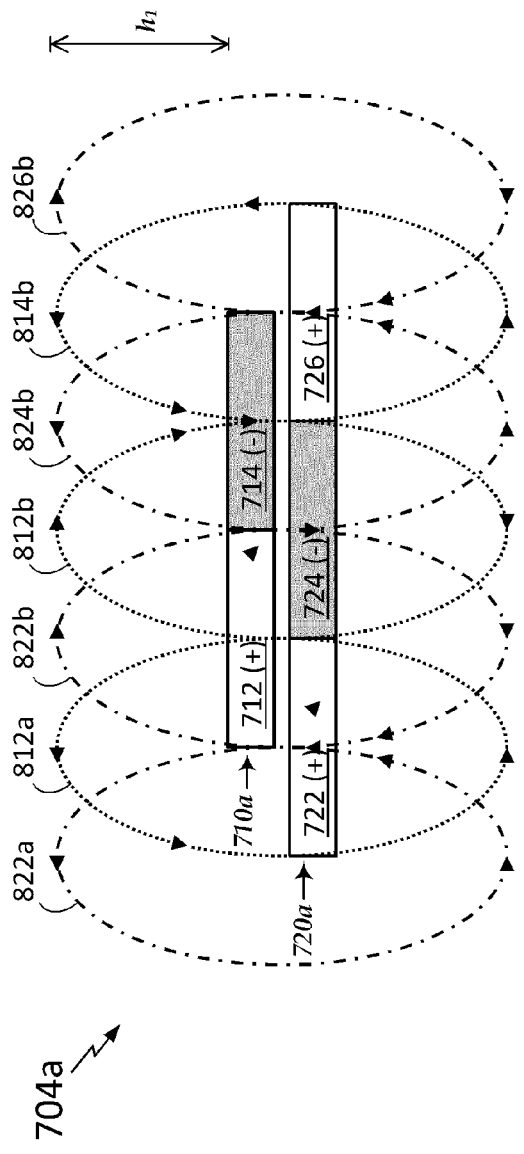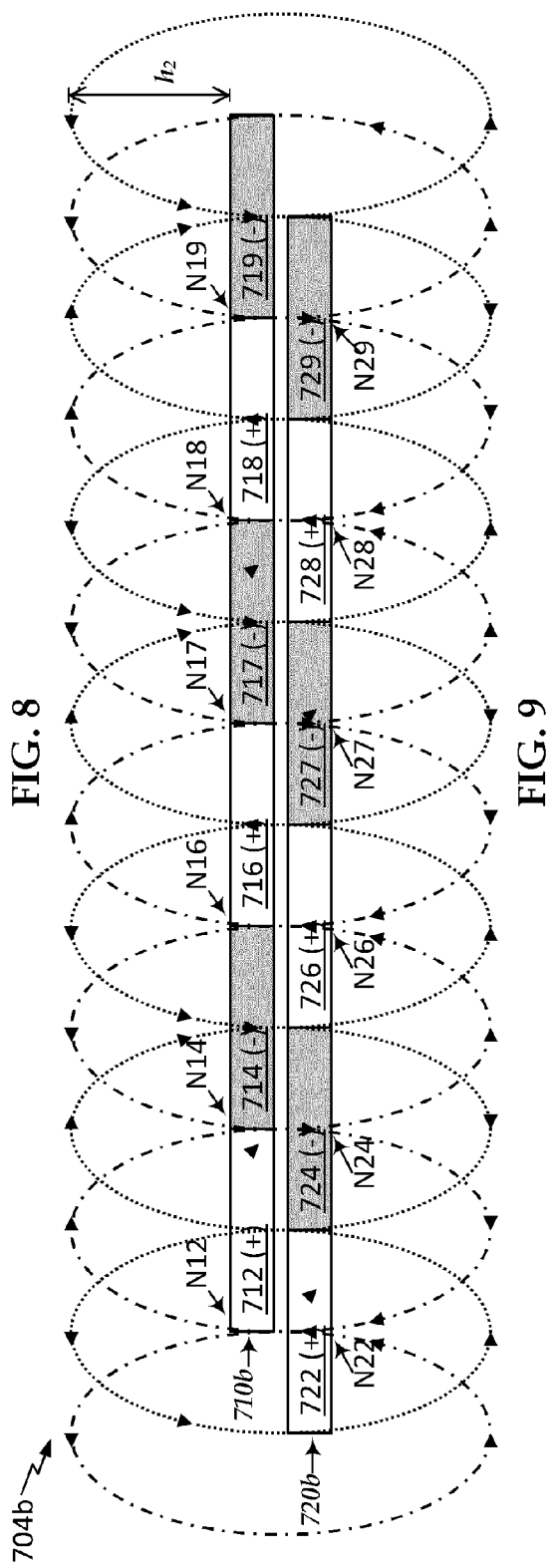
FIG. 8
FIG. 9

WIRELESS POWER ORTHOGONAL POLARIZATION ANTENNA ARRAY

FIELD

The present invention relates generally to wireless power. More specifically, the disclosure is directed to wireless power transfer to remote systems.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmission device. The device comprises a driver circuit configured to generate first and second driver signals. The device further comprises a first antenna array of antenna coils configured to generate a first wireless field based on the first driver signal powering the first antenna coils such that adjacent antenna coils of the first antenna array are powered with opposite polarities. The device further comprises a second antenna array of antenna coils partially overlapping the first antenna array. The second antenna array is configured to generate a second wireless field orthogonal to the first wireless field. The second wireless field can be generated based on the second driver signal powering the second antenna array such that adjacent antenna coils of the second antenna array are powered with opposite polarities.

Another aspect of the disclosure provides a method for wireless power transmission. The method comprises generating first and second drive signals. The method further comprises generating a first wireless field via a first antenna array of antenna coils by powering the first antenna array based on the first driver signal. Powering the first antenna array can comprise powering adjacent coils of the first antenna array with opposite polarities. The method further comprises generating a second wireless field orthogonal to the first wireless field via a second antenna array of antenna coils by powering the second antenna array based on the second driver signal. The first antenna array can at least partially overlap the second antenna array. Powering the second antenna array can comprise powering adjacent coils of the second antenna array with opposite polarities.

Another aspect of the disclosure provides an apparatus for wireless power transmission. The apparatus comprises means for generating first and second driver signals. The apparatus further comprises a plurality of means for generating a first wireless field based on the first driver signal powering the plurality of first wireless field generating means such that adjacent means of the plurality of first wireless field generating means are powered with opposite polarities. The apparatus further comprises a plurality of means for generating a second wireless field orthogonal to and at least partially overlapping the first wireless field. The second wireless field can be based on the second driver signal powering the plurality of second wireless field generating means such that adjacent means of the plurality of second wireless field generating means are powered with opposite polarities.

BRIEF DESCRIPTION OF THE DRAWINGS

FIG. 8 illustrates a side view of an example charging pad of FIG. 7 in accordance with exemplary embodiments.

FIG. 9 illustrates a side view of another example charging pad of FIG. 7 in accordance with exemplary embodiments.

Figure 1:
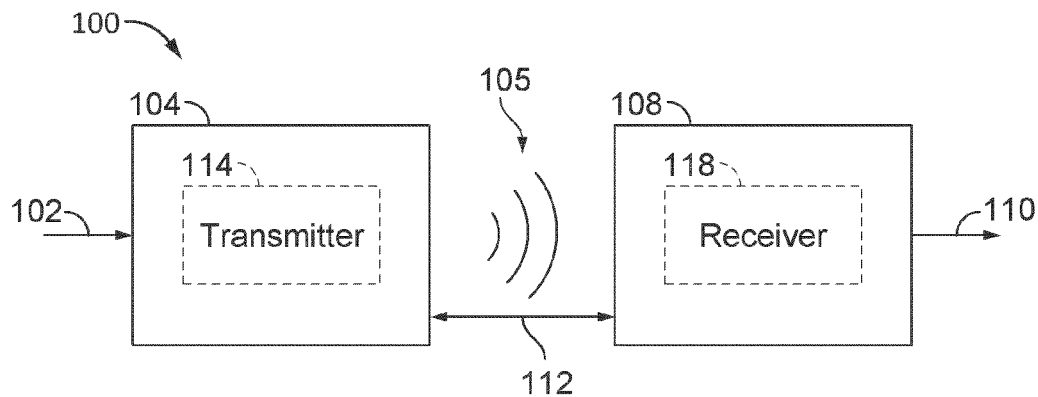
FIG. 1 is a functional block diagram of an example wireless power transfer system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" or "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
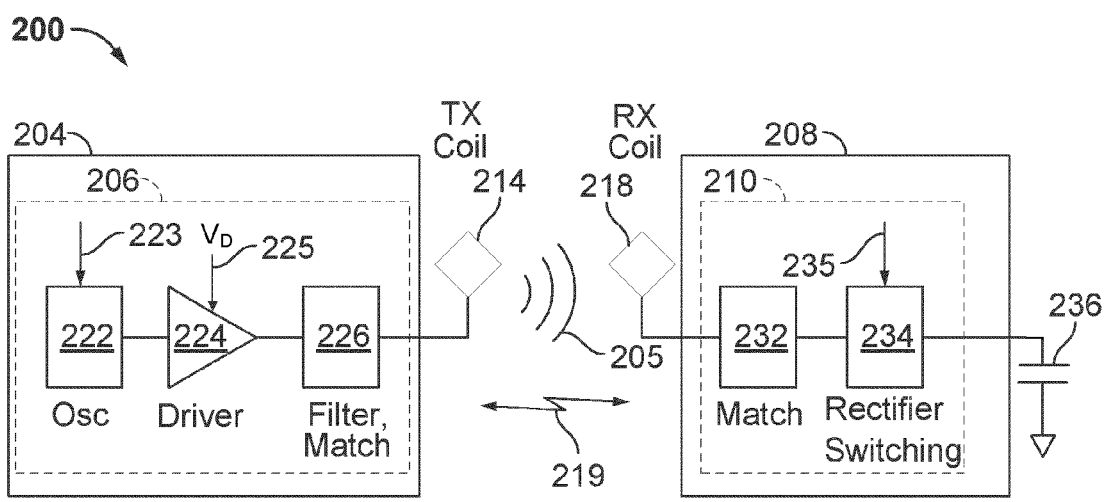
FIG. 2 is a functional block diagram of example components that may be used in the wireless power transfer system of FIG. 1.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID) may be configured to receive power from a wireless power transfer field and communicate by interacting with the wireless power transfer field and/or utilize the received power to communicate with a transmitter 204 or other devices.

Figure 3:
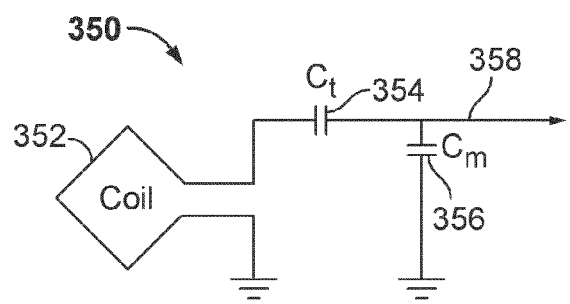
FIG. 3 is a schematic diagram of a portion of transmit circuitry or receive circuitry of FIG. 2 including a transmit or receive coil.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As an example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
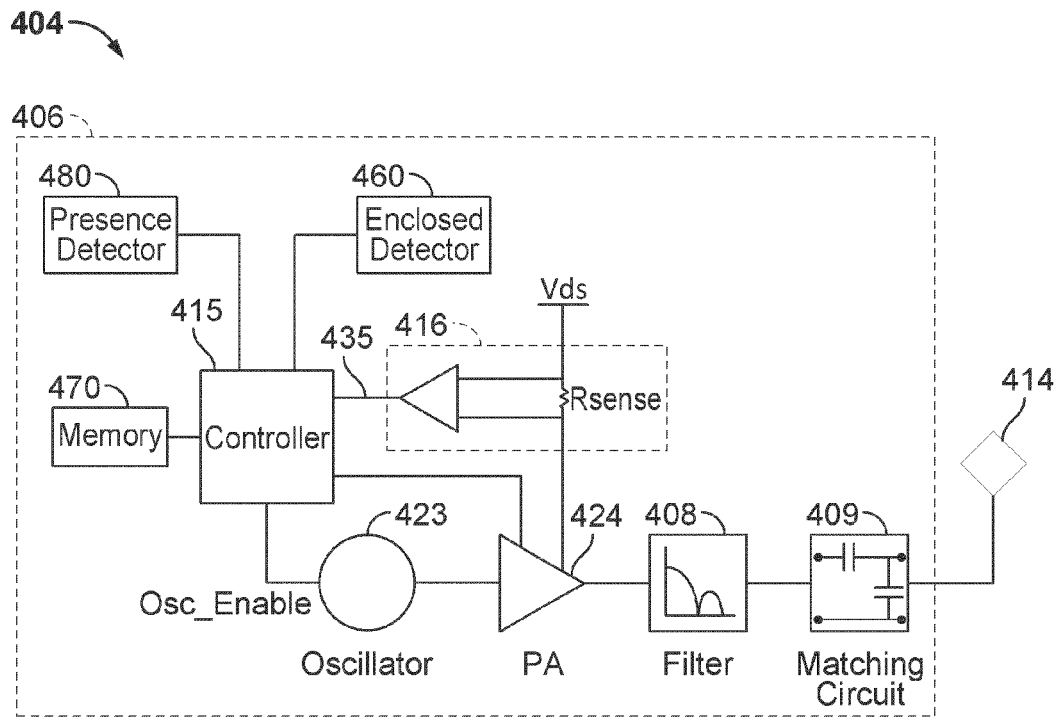
FIG. 4 is a functional block diagram of a transmitter that may be used in the wireless power transfer system of FIG. 1.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As an example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As an example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As an example, the time interval may be longer than that needed to fully charge a specific type of wireless device under the assumption of the device being initially fully discharged.

Figure 5:
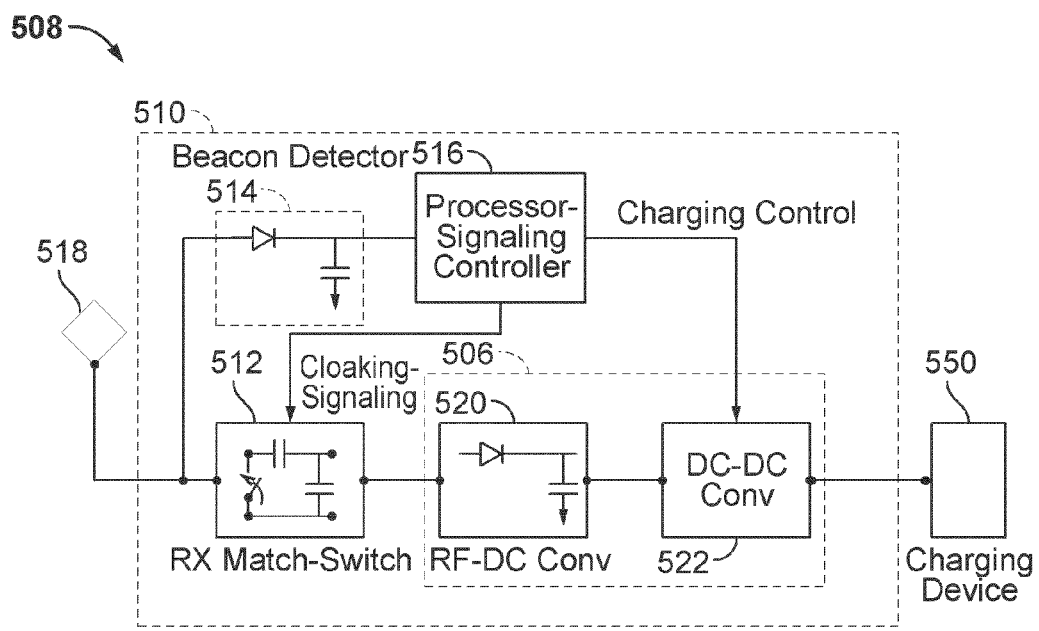
FIG. 5 is a functional block diagram of a receiver that may be used in the wireless power transfer system of FIG. 1.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (or other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
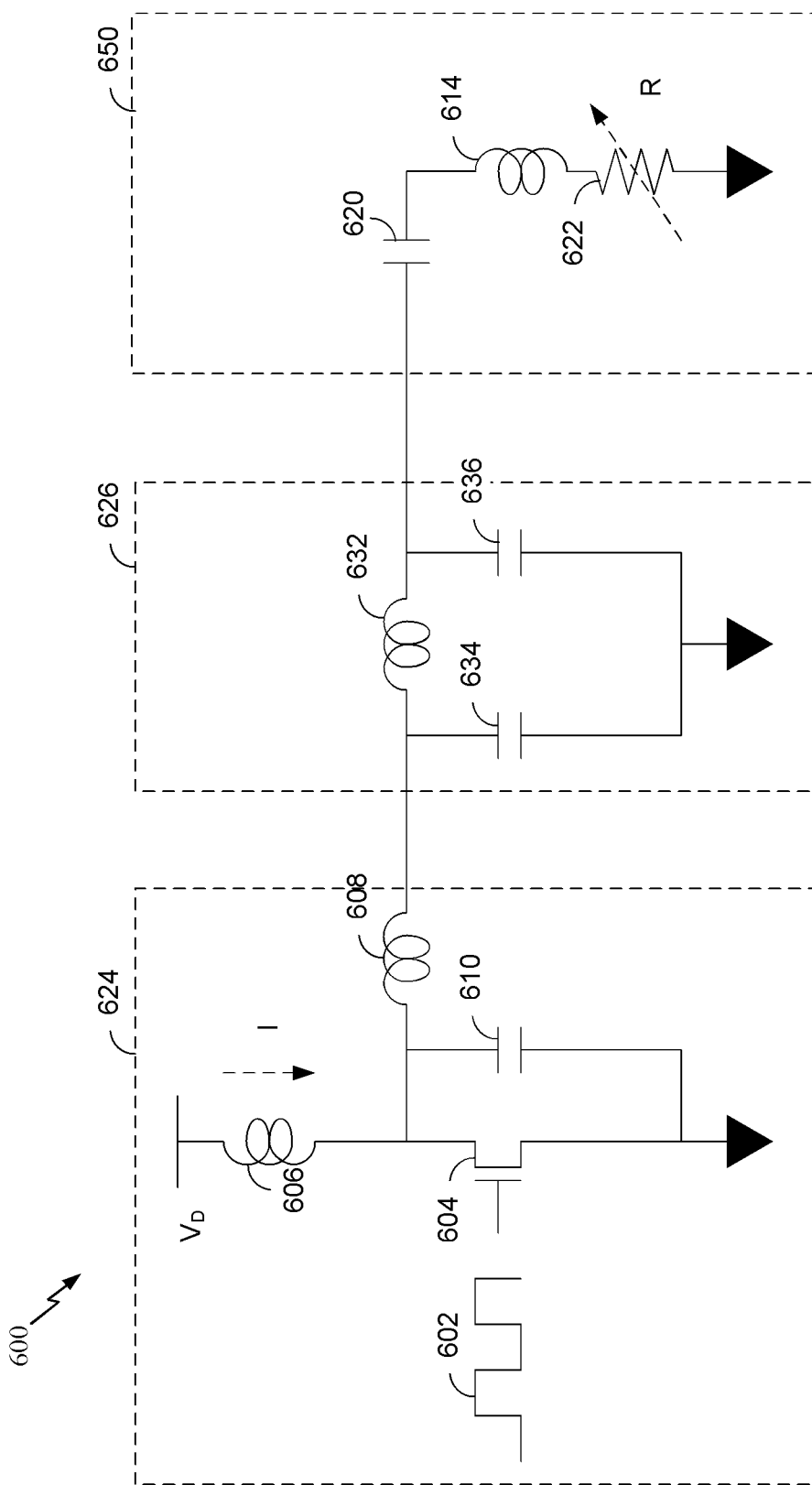
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases, the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In some circumstances, large charging surfaces, such as a charging pad, may be desirable. For example, a charging pad with large dimensions may be effective for charging large devices, such as a laptop, a media system, a vehicle, and/or the like devices, or may be effective for charging multiple devices concurrently. One way to achieve larger dimensions of a charging pad is to increase the size of the transmit antenna or coil. However, increasing the size of the transmit coil, while maintaining certain power-level objectives for charging, may increase the distance the wireless field may propagate from the surface of the charging pad. For example, a generated electromagnetic field may undesirably propagate to unintended distances from the wireless power transmitter. Radiating electromagnetic fields may undesirably interfere with nearby objects and devices and may increase power losses. In one aspect, certain example embodiments disclosed herein relate to generating a wireless field over a surface sufficient for charging or powering electronic devices, without propagating the wireless field to undesirable distances. As a non-limiting example, orthogonal (e.g., wirelessly and/or magnetically decoupled) first and second antenna arrays and transmit circuitry configured to drive the transmit antenna arrays orthogonally (e.g., substantially non-interfering for charging and/or powering) are described.

Figure 7:
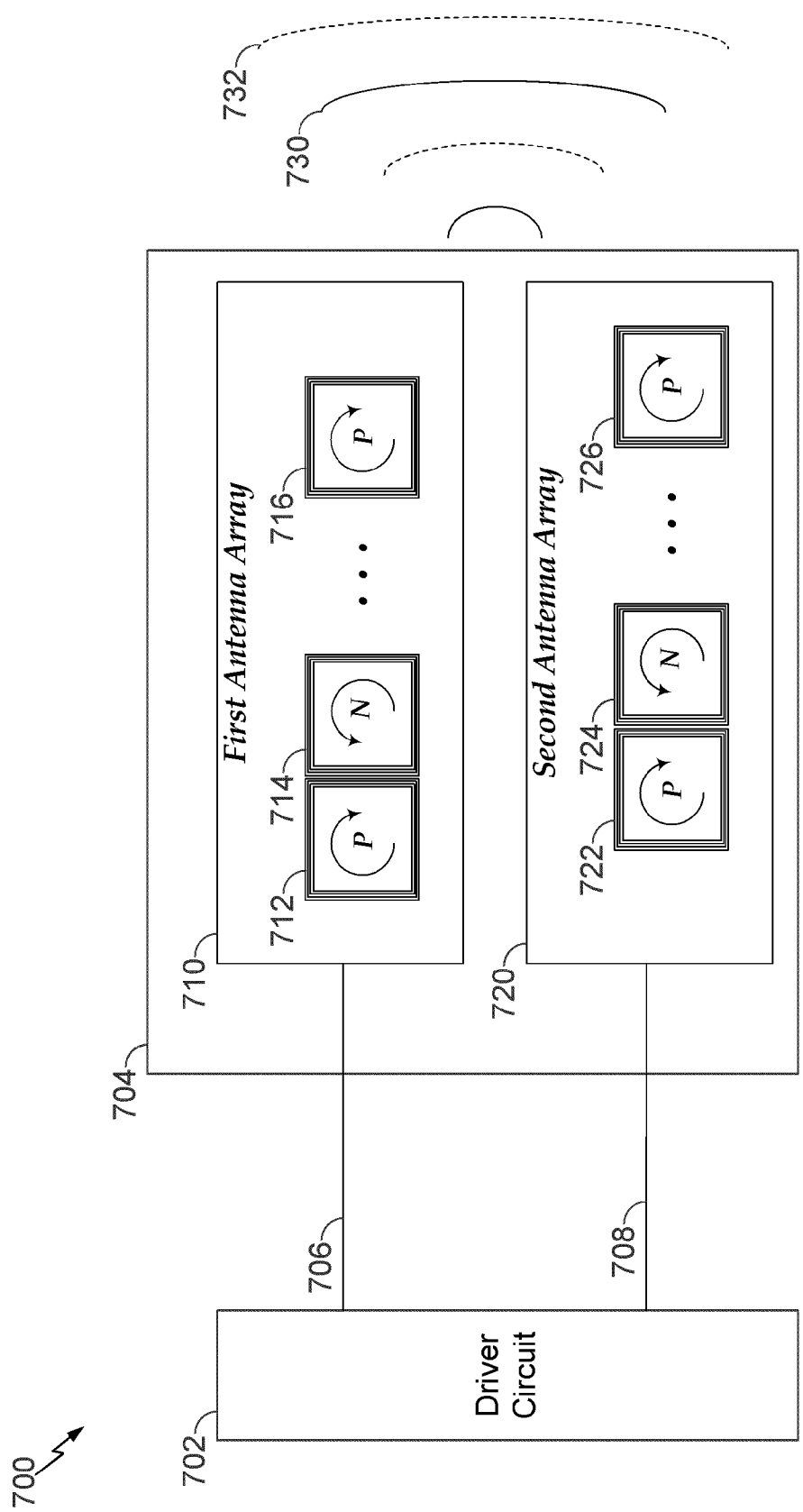
FIG. 7 is a functional block diagram of a wireless power transfer system in accordance with exemplary embodiments.

FIG. 7 is a functional block diagram of a wireless power transfer system 700 in accordance with exemplary embodiments. The wireless power transfer system 700 may include a driver circuit 702 and a charging pad 704 interconnected by first and second drive lines 706, 708. The charging pad 704 may include a first antenna array 710 having a plurality of antenna coils 712, 714, 716, and the second antenna array 720 may include a plurality of antenna coils 722, 724, 726.

The driver circuit 702 can be configured to generate first and second drive signals as outputs on the first and second drive lines 706, 708. For example, the driver circuit 702 may be operatively coupled to a power source (not shown) for supplying power to generate the first and second drive signals for powering the charging pad 704. In the example illustrated embodiment, the first and second drive signals can power the first and second antenna arrays 710, 720 to generate first and second wireless fields 730, 732, respectively, at a frequency. The generated wireless fields 730, 732 of the charging pad 704 can wirelessly charge or power a chargeable device (not shown). The manner of coupling power wirelessly may be by magnetic coupling of an alternating current.

As described below in further detail, the driver circuit 702 can be configured to generate the drive signals in a way that generates the first wireless field 730 orthogonally with respect to the second wireless field 732 (e.g., at a given location on the charging pad 704, there is about 90 degrees phase different between the first and second wireless fields 730, 732). For example, the first and second drive signals may be orthogonal, e.g., the first and second drive signals may have substantially periodic waveforms, such as sinusoidal, with a relative phase shift of about 90 degrees between the first and second drive signals.

In one example embodiment, the driver circuit 702 may be connected to a mains utility or other input power source and configured to convert input power source to a higher frequency ranging from hundreds of Hertz into the Megahertz. In other aspects, the driver circuit 702 may convert power to a frequency below hundreds of Hertz or to a frequency above one Megahertz. In some aspects, the power output of the driver circuit 702 may range from a few Watts to approximately 100 Watts. It will be appreciated, however, that the input power source can be scaled to any practical power level. In other aspects, the power output may range below a few Watts to above kiloWatts. It will be appreciated that any applicable power source, frequency range, and/or power range may be selected.

The charging pad 704 can be configured to receive the first and second drive signal carried on the first and second drive lines 706, 708 as inputs and configured to generate wireless fields 730, 732 as an output. The charging pad 704 may be a substantially flat surface effective for supporting one or more electrical devices. For example, the charging pad 704 may be a portion of the top-facing surface of a table. The charging pad 704 can be sized to accommodate, for example, a laptop computer, a tablet computing device, two or more portable devices, and/or the like chargeable devices. Numerous other configurations with different shapes, sizes, and orientations are envisioned and within the spirit of this disclosure. As examples, the charging pad 704 surface may be located on an item such as a refrigerator or built within part of a surface such as a kitchen countertop. In other examples, the charging pad 704 surface may be orientated horizontally such as depicted or vertically such as along or within a wall. The chargeable device may be a smart phone, tablet computer, laptop computer, or television, among other possibilities.

The first antenna array 710 of the charging pad 704 can include a plurality of antenna coils 712, 714, 716. When powered, the first antenna array 710 can be configured to generate the first wireless field 730. For example, the first drive signal can power one or more or each of the antenna coils 712, 714, 716 such that the collection of powered coils generate wireless fields that form the first wireless field. In one embodiment, the first wireless field can be substantially a magnetic field varying at a frequency.

The second antenna array 720 of the charging pad 704 can include a plurality of antenna coils 722, 724, 726. When powered, the second antenna array 720 can be configured to generate the second wireless field 732. For example, the second drive signal can power one or more or each of the antenna coils 722, 724, 726 such that the collection of powered coils generate wireless fields that form the second wireless field. In one embodiment, the second wireless field can be substantially a magnetic field varying at a frequency.

In one embodiment, the first and second antenna arrays 710, 720 can be positioned so that the arrays at least partially overlap. For example, the first antenna array 710 can form a first layer of the charging pad 704 positioned above the second antenna array, which forms a second layer of the charging pad 704. As such, the generated first and second wireless fields 730, 732 can spatially coincide at least on a portion of the charging pad 704.

The antenna coils 712, 714, 716, 722, 724, 726 can conduct an alternating current to generate a wireless field. In accordance with an embodiment, the coils 712, 714, 716, 722, 724, 726 may be formed from a Litz wire coil. Each coil can have any applicable inner diameter and outer diameter effective for wireless power transmission.

Additionally or alternatively, the antenna coils 712, 714, 716 of the first antenna array 710 may be configured as folded antennas. Examples of folded antennas include two or more antenna coils configured such that adjacent antenna coils are powered with opposite or different polarities. For example, adjacent coils can be configured to conduct or carry current in opposite or different rotational directions. For example, a coil may be connected in series with an adjacent coil and counter-wound with respect to the adjacent coil. As another example, adjacent coils may be driven or powered with opposite or different polarities, e.g., by reversing the connection of the drive lines with the terminals of the coils. As such, in one example embodiment, if current flows through the coil 712 in a clock-wise rotational direction, current flows through the coil 714 in a counter-clockwise rotational direction.

Accordingly, when the wireless field generated in the center of one coil points upward (e.g., the one coil forms a positive pole, generating a wireless field with a positive polarity), the wireless field generated in the center of the other coil points downward (e.g., the other coil forms a negative pole, generating a wireless field with a negative polarity). Similarly, the coils 714 and 716 may be adjacent and coil 714 may be counter-wound or connected with an opposite or different polarity with respect to coil 716. The pattern of counter-wound adjacent coils and/or alternating polarities can continue for any applicable number of coils in the first antenna array 710 in any applicable number of dimensions (e.g., a two-dimensional array). In a particular embodiment, the number of coils of the first antenna array 710 can be about two to six coils (e.g., along a first dimension as described in further detail in connection with FIG. 9). Furthermore, in a folded antenna configuration, the coils of the antenna array can be formed from an electrically-connected winding, such as a single wire or circuit, or be formed as separate circuits each driven by a respective drive line.

Additionally or alternatively, the antenna coils 722, 724, 726 of the second antenna array 720 may be configured as folded antennas, e.g., in a similar fashion as described in connection with the coils 712, 714, 716 of the first antenna array 710. In a particular embodiment, the number of coils of the second antenna array 720 can be about two to about six coils along a second dimension (for example, along a first dimension).

Although not illustrated, in some embodiments the charging pad may further include a magnetic material (e.g., a ferrite structure) and a conductive back plate. For example, the coils 712, 714, 716, 722, 724, 726 may be positioned above the magnetic material, and the magnetic material may be positioned above the conductive back plate. In addition, the charging pad 704 may include insulating layers between the conductive shield and the magnetic material and between the magnetic material and the coils 712, 714, 716, 722, 724, 726.

As described below in further detail in connection with FIGS. 8 and 9, including at least one antenna array, such the first and/or second antenna arrays 710, 720, can aid in increasing the size of the charging pad 704 without substantially increasing the distance the wireless field propagates from the surface of the charging pad 704. Additionally or alternatively, including at least two antenna arrays, such the first and second antenna arrays 710, 720, can aid in improve the effectiveness of the charging pad 704 in generating a wireless field across the desired surface of the charging pad 704.

For example, in one specific example embodiment, the charging pad 704 can have a charging area of at least the size of about a laptop. In certain embodiments, the charging area of the charging pad 704 can have a length greater than about 10 inches and a width greater than about 6 inches. The charging pad 704 can be configured to generate a combined or composite wireless field of the first and second wireless fields 730, 732 at a power level sufficient for selectively powering and/or selectively charging a laptop (not shown). In some embodiments, the combined wireless field may have no substantial dead zones. For example, the combined wireless field has no substantial dead zones if wireless field is effective for charging and/or powering independent of the location of the device as long as the device is placed on the surface of the charging pad 704 and within the charging area. An example of a wireless field effective for powering and/or charging is a wireless field providing 30 Watts. Another example of a wireless field effective for powering and/or charging is a wireless field providing about 15 to 30 Watts. The charging pad 704 can be configured to generate the combined wireless field of the first and second wireless fields such that the combined wireless field substantially decays beyond a height of approximately the diameter of an individual coil. An example of a height at which wireless field substantially decays is a height beyond which the wireless field has decayed by a factor of at least about ten. For example, the combined wireless field can decay to approximately a tenth or less of its peak energy at a height greater than the diameter of the individual coils. As such, an example of a height to which a wireless field propagates is the height before which the wireless field has not substantially decayed. In other examples, the height of propagation includes heights less than height at which the wireless filed substantial decays. For instance, in some embodiments a height of propagation includes heights at which the wireless field has decayed by a factor of two or less.

Accordingly, in one embodiment an array (e.g., a one-dimensional or multi-dimensional array) of similarly-sized square loops (e.g., an array of ten-by-ten coils) can be arranged in a folded-loop pattern, thereby extending the charging area laterally on a plane (e.g., in the x direction and/or the y-direction) without substantially increasing the near-field propagation. That is, in some embodiments, the near-field strength in the height or z direction can be independent of the array size (e.g., the number of coils of the array and/or the charging area of the folded array). In addition, due in part to the folding pattern, the radiation of the far-field in the z-dimension can be reduced, attenuated, and/or canceled. For example, a pair of adjacent folded coils can be configured to generate fields that cancel or attenuate each other in the far field while retaining the local B-Field magnitude. Thus, the far-field can be attenuated or reduced, e.g., on a folded-pair by fold-pair basis, substantially independent of array size.

In one embodiment, the folded coils can have dimensions larger than the receiver coil configured to couple to the generated wireless field. It will be appreciated that decreasing the size of the folded coils into smaller coils can reduce the inductance and increase the copper losses (e.g., lowering the Q factor) of the folded coils.

FIG. 8 illustrates a side view of an example charging pad 704a of FIG. 7 in accordance with exemplary embodiments. Elements of FIG. 8 common to FIG. 7 share common reference indicia, and only differences between the figures are described herein for the sake of brevity. The charging pad 704a may include a first antenna array 710a of two coils, such as folded coils 712, 714, and a second antenna array 720a of three coils, such as folded coils 722, 724, 726.

In the illustrated embodiment, the folded antenna coils 712, 714 of the first antenna array 710a are substantially coplanar. For example, the first antenna array 710a can form a planar layer providing the first wireless field for a planar-type charging pad. In addition, or alternatively, the folded antenna coils 722, 724, 726 of the second antenna array 720a can be coplanar. For example, the second antenna array 720a can form a second planar layer providing the second wireless field for the planar-type charging pad.

The first antenna array 710a may at least partially overlap the second antenna array 720a. In one embodiment, the two antenna arrays 710a, 720a may overlap with an offset such that the first antenna array is magnetically decoupled from the second antenna array. For example, in the illustrated embodiment the first antenna array 710a is position over the second antenna array 720a such that the coil patterns are shifted by half the width of the coils. In particular, the centers of the coils of the first antenna array are positioned over the junction of two neighboring coils of the second antenna array 720a. In other words, in some embodiments, the first array can be shifted relative to the second antenna array an amount of about half of the spatial period of the pattern of the first and second antenna arrays. In this way, the first and second antennas may not substantially couple magnetically when powered.

In operation, when powered, the first and second antenna arrays 710a, 720a may generate wireless fields that extend through and beyond the surface of the charging pad 704a. For example, the coils 712, 714 of the first antenna array 710a can generate a magnetic field, having a magnetic flux line 812b, that couples the coils 712, 714. In particular, if driven with currents that flow with opposite or different rotations, this coil arrangement can produce two distinct magnetic pole areas and the magnetic flux line 812b arcs between them in the form of a "flux pipe" above the coils, e.g., a zone of high flux concentration above the center of, and normal to, each coil 712, 714. Additionally, the magnetic field generated by the coil 712 of the first antenna array 710a can also have a magnetic flux line 812a, and the magnetic field generated by the coil 714 of the first antenna array 710a can also have a magnetic flux line 814b.

In similar operation, the coils 722, 724, 726 of the second antenna array 720a can generate magnetic fields having magnetic flux lines 822b, 824b that at least pair-wise couple the coils 722, 724, 726. This coil arrangement produces three magnetic pole areas and magnetic flux lines 822b, 824b between the centers of adjacent coils in the form of flux pipes through coils 722, 724, 726, e.g., with a zone of high flux concentration at the center and normal to each of these coils. Additionally, the magnetic field generated by the coil 722 of the second antenna array 720a can also have a magnetic flux line 822a, and the magnetic field generated by the coil 726 of the second antenna array 720a can also have a magnetic flux line 826b.

In addition, the illustrated example embodiment shows that the flux pipes attain a distance $h_1$ from the surface of the charging pad 704a. In one embodiment, a receive antenna within a distance of $h_1$ may couple to the wireless field produced by the charging pad 704a.

In one embodiment, the first and second antenna arrays 710a, 720a are configured to generate the first and second wireless fields in a predominately tangential direction at far filed. For example, as stated the illustrated coil arrangement of the first antenna array 710a can produce two distinct magnetic pole areas at the centers of, and normal to the coils 712, 714 of the first antenna array 710a, and the magnetic flux line 812b between them in the form of a flux pipe above the coils. In addition, the coil arrangement of the second antenna array 720a can produce three magnetic pole areas at the centers of the coils 722, 724, 726 of the second antenna array 720a, and the magnetic flux lines 822b, 824b between the centers of adjacent coils in the form of flux pipes above the coils 722, 724, 726. Both the normal and tangential components of the magnetic field generated by this structure rapidly decay as a function of distance due to the canceling effect of the alternating coil polarity arrangement.

In one embodiment, the first antenna array 710a can be configured to power each of the folded antenna coils of the first antenna array when a driver circuit (for example, the driver circuit 702 of FIG. 7) powers the first antenna array 710a. For example, each of the coils 712, 714 can be electrically connected such that current from one coil flows to the next coil. In one embodiment, the second antenna array 720a can be configured to power each of the folded antenna coils of the second antenna array 720a when a driver circuit (for example, the driver circuit 702 of FIG. 7) powers the second antenna array 720a. For example, each of the coils 722, 724, 726 can be electrically connected such that current from one coil flows to the next coil. In other embodiments, one or more of the coils of the respective first and/or second antenna arrays 710a, 720a may be powered independently (for example, by separate driver circuits).

As stated, the first antenna array 710a and the driver circuit 702 can be configured to power the folded antenna coils 712, 714 of the first antenna array 710a with alternating polarities. For example, current flows in opposite or different directions with respect to the coils 712, 714. As such, the magnetic flux line 802 flows out of the coil 712 and into the coil 714. In addition or alternatively, the second antenna array 720a and the driver circuit 702 are configured to power the folded antenna coils 722, 724, 726 of the second antenna array 720a with alternating polarities. For example, current flows in opposite or different directions pair-wise with respect to the coils 722, 724, 726. As such, the magnetic flux line 804 flows out of the coil 722 and into the coil 724, and the magnetic flux line 824b flows out of the coil 726 and into the coil 724.

FIG. 9 illustrates a side view of another example charging pad system 704b of FIG. 7 in accordance with exemplary embodiments. Elements of FIG. 9 common to FIG. 8 share common reference indicia, and only differences between the figures are described herein for the sake of brevity. In particular, the charging pad 704b having a first antenna array 710b of six coils 712, 724 and 716-719 and a second antenna array 720b of six coils 722, 724, and 726-729.

In comparison with the charging pad 704a of FIG. 8, the charging pad 704b includes additional folded coils (e.g., coils 715-718, 727, and 728) in each of the first and second antenna arrays 710b, 720b. It will be appreciated that the distance that the wireless field (e.g., a B-field) flows or propagates in the height (normal) direction or the z-direction is based at least on the radius of the antenna coil, among other factors. For example, propagation can increase with coil radius. The additional coils of the first and second antenna arrays 710b, 720b can aid in reducing the radius of each individual coil and, in turn, the height $h_2$. In the same way, the additional coils of the first and second antenna arrays 710b, 720b can aid in increasing the charging area of the charging pad 704b while maintaining acceptably short propagation distances $h_2$.

In addition, another advantage, among others, of various embodiments described herein that includes the first antenna array 710b is that the charging area can be increased while inhibiting wireless field propagation. For example, if a single unfolded loop is being used as the transmit antenna of a charging pad, then the single unfolded loop should be sized with dimensions related to the charging area of the charging pad. As a result, the wireless field generated by a single large coil may propagate to undesirable distances from the surface of a large charging pad. As stated, the increased propagation may interfere with nearby objects and create inefficiencies. Thus, the first antenna array 710b can aid in increasing the charging area by using more coils, each having a suitable radius.

One drawback of specific embodiments (for example, embodiments without the second antenna array 720b) is that increasing the number of coils of the first antenna array 710b may increase the regions of reduced energy levels ("nulls" or "dead zones"). For instance, the wireless field may have nulls or dead zones about the perimeters of the coils of the first antenna array 710b labeled as N12-N19. Without compensating for these nulls, the areas around the perimeters of the coils of the first antenna array 710b may not be effective for charging or powering chargeable devices.

Thus, one aspect of various example embodiments disclosed herein relates to generating a wireless field sufficient for charging or powering electronic devices over a large surface, without causing substantial wireless radiation, and without causing position dependent dead zones. Thus, in one aspect, it is desirable to reduce dead zone area as described in greater detail below.

Advantageously, the charging pad can include a transmit circuit configured to generate orthogonal first and second drive signals for powering the first and second antenna arrays. For example, the first and second drive signals can be periodic waveforms, such as sinusoidal signals, with a relative phase shift of 90 degrees. In one embodiment, this can be achieved using a phase shift network composed of capacitive and/or inductive elements. In another embodiment, active components, such as two or more amplifiers, can power the arrays with the orthogonal first and second drive signals.

In operation, the first antenna array 710b can generate the first wireless field and the second antenna array 720b can generate the second wireless field. Because of the relative displacement between the first and second antenna arrays 710b, 720b, and because of the decoupling between the first and second antenna arrays, the areas of the dead zones N12-N19 of the first wireless field approximately coincide spatially with the areas of peak intensity of the second wireless field, labeled by N22-29. Likewise, the areas of peak intensity of the first wireless field correspond spatially to the dead zones of the second wireless field. Accordingly, the superposition of the first and second wireless fields can have reduced dead zones for a more uniform charging field. Moreover, where orthogonal first and second drive signals are used, the peaks of the combined wireless field will be time varying and will shift periodically between the locations of the peaks corresponding to the first wireless field and the locations of the peaks corresponding to the second wireless field. The periodic sweeping action of the wireless field can aid in averaging out power distribution spatially over the charging pad 704b.

Figure 10:
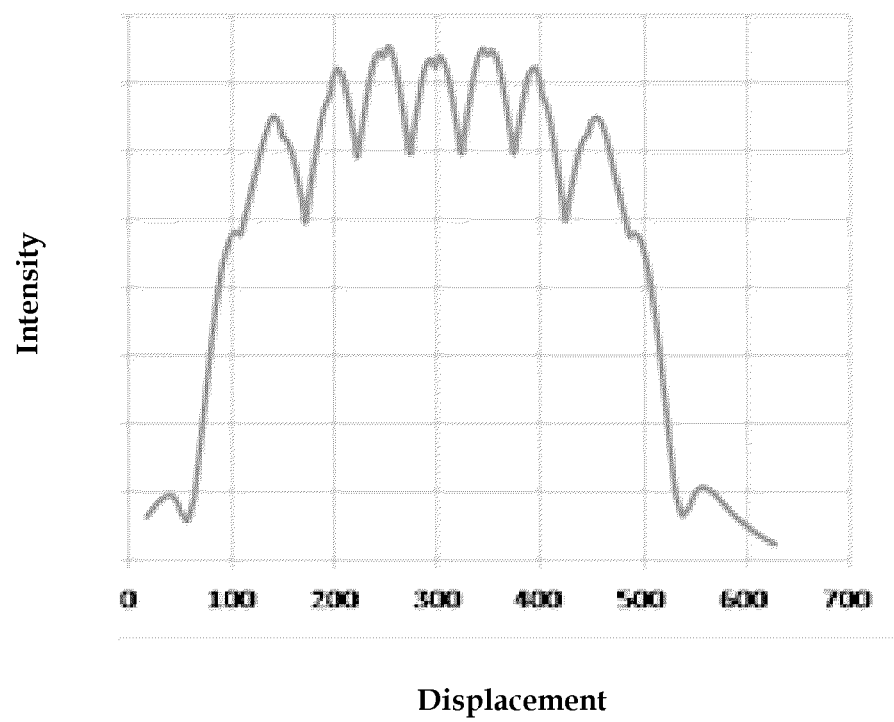
FIG. 10 is a plot of exemplary values of the average intensity of the composite wireless field as a function of displacement along the surface of the charging pad of FIG. 9.

FIG. 10 is a plot 1000 of exemplary values of the average intensity of the combined wireless field (e.g., the first and second wireless fields 730, 732) as a function of displacement along the surface of the charging pad 704 of FIG. 7. The plot 1000 was generated by simulating the behavior of the charging pad 704 with four coils in each of the first and second antenna arrays 710, 720. FIG. 10 indicates generating orthogonal first and second wireless fields can effectively eliminate or mitigate the nulls of the individual wireless fields in the combined wireless field. In operation, the location of the peak intensity of the combined wireless field can vary with time. For example, the location of the peak intensity of the combined wireless field can sweep back and forth between the locations of the peaks of the first wireless field and the peaks of the second wireless field.

Figure 11:
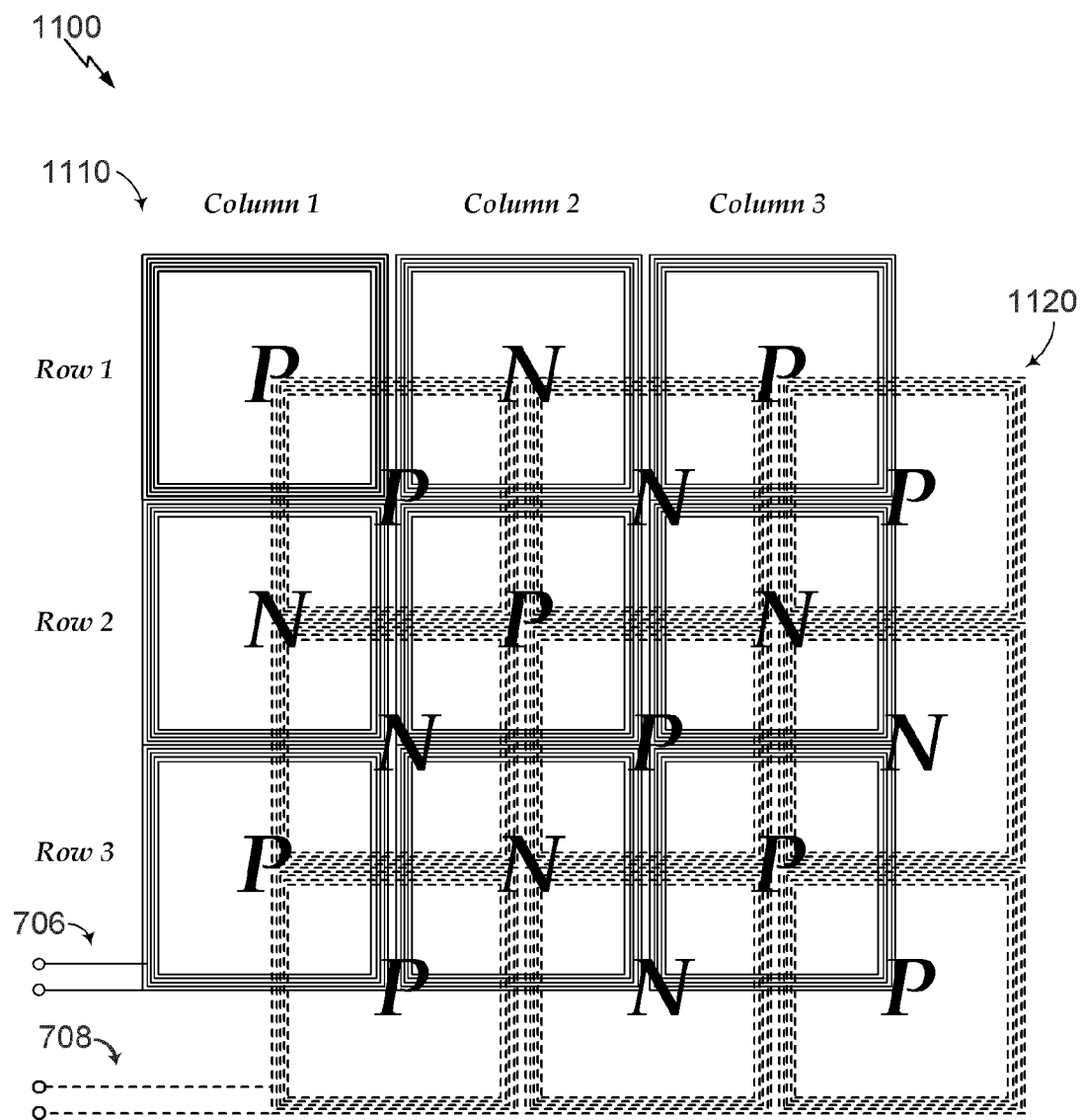
FIG. 11 illustrates a top view of an example charging pad system in accordance with exemplary embodiments.

FIG. 11 illustrates a top view of an example charging pad system 1100 in accordance with exemplary embodiments. The illustrated embodiment includes first and second two-dimensional antenna arrays 1110, 1120. The first two-dimensional antenna array 1110 has three rows and three columns. The second two-dimensional antenna array 1120 has three rows and three columns. In one specific example embodiment, the two-dimensional antenna arrays 1110, 1120 can each comprise a 3-by-3 array. In other example embodiments, the two-dimensional antenna arrays 1110, 1120 can each have a size selected from about 2-by-2 coils to about 10-by-10 coils. It will be appreciated, however, that the two-dimensional antenna arrays 1110, 1120 can have any applicable number or rows and columns. The two-dimensional antenna arrays 1110, 1120 can aid in extending the size of the charging pad system 1100 in two dimensions, inhibiting wireless field propagation, and/or inhibiting dead zones.

Figure 12:
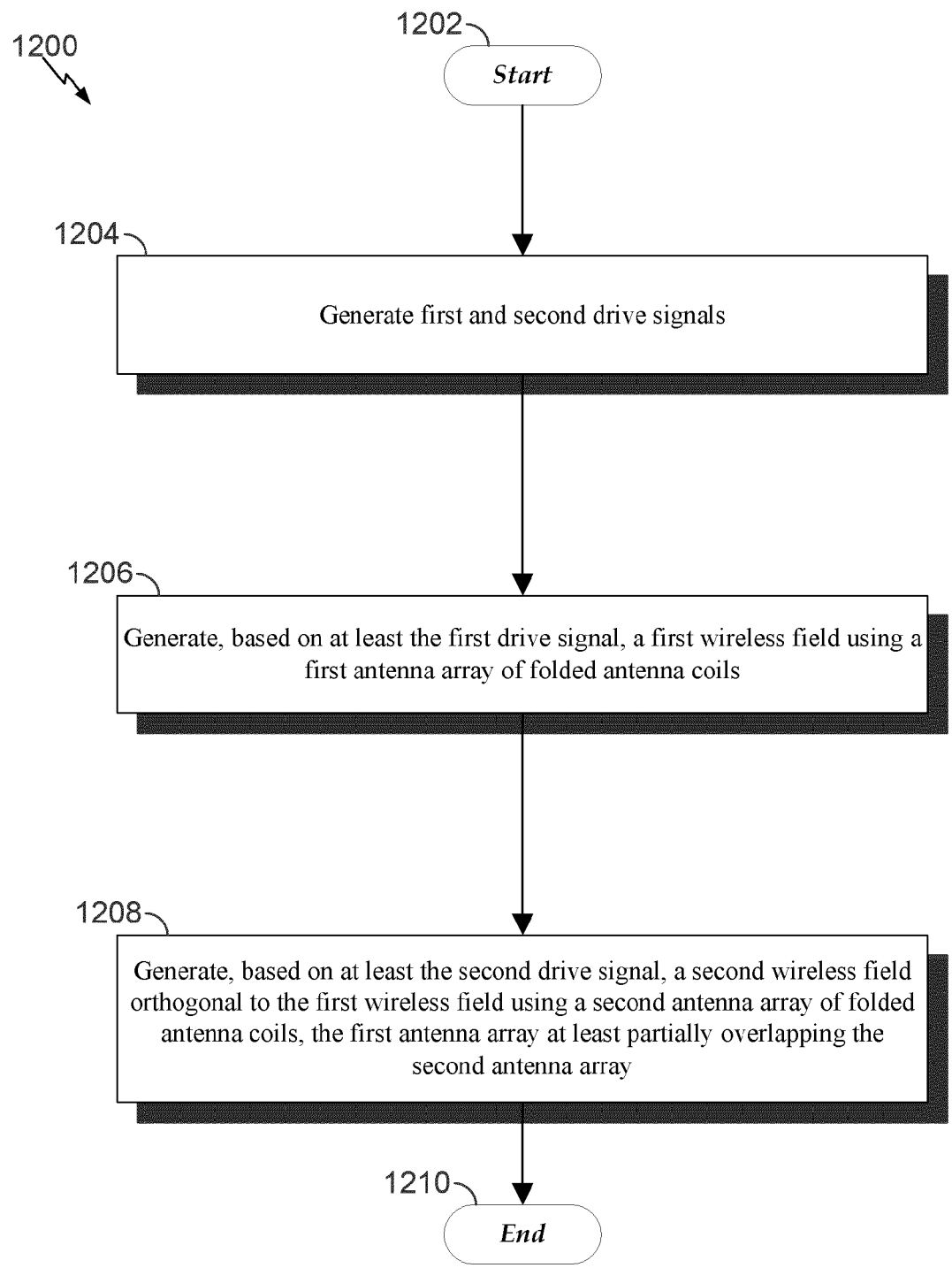
FIG. 12 is a flowchart of an implementation of a method of wirelessly transmitting power, in accordance with an embodiment.

FIG. 12 is a flowchart of an implementation of a method 1200 of wirelessly transmitting power, in accordance with an embodiment. The method 1200 starts at block 1202 and proceeds to block 1204 for generating first and second drive signals. For example, circuitry can be used to generate drive signals for powering one or more antenna coils for power transfer. In one specific example, the driver circuit 702 of FIG. 7 can be used to generate the drive signals provided by the drive lines 706, 708 and carried to the first and second antenna arrays 710, 720.

After the first drive signal is generated, the method 1200 can proceed to block 1206 for generating, based on at least the first drive signal, a first wireless field using a first antenna array of folded antenna coils. In one specific example, the first antenna array can correspond to the first antenna array 710 of FIG. 7. For example, the first antenna array 710 can generate the first wireless field based on the first drive signal provided by the driver circuit 702. The first drive signal can power the antenna coils 712, 714, 716 to generate the first wireless field, e.g., with alternating polarities as described in connection with FIGS. 7 and 8.

After the second drive signal is generated, the method 1200 can proceed to block 1208 for generating, based on at least the second drive signal, a second wireless field orthogonal to the first wireless field using a second antenna array of folded antenna coils. The first antenna array can be at least partially overlapping the second antenna array. In one specific example, the first antenna array can correspond to the second antenna array 720 of FIG. 7. For example, the second antenna array 720 can generate the second wireless field based on the second drive signal provided by the driver circuit 702. The second drive signal can power the antenna coils 722, 724, 726 to generate the second wireless field, e.g., with alternating polarities as described in connection with FIGS. 7 and 8.

It will be appreciated that the method 1200 can perform blocks 1206 and 1208 in any order. The method 1200 ends at block 1210.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations. Means for generating orthogonal first and second drive signals may be provided by the drive circuit 702 of FIG. 7. Means for generating a first wireless field may be provided using the first antenna array 710 of FIG. 7. Means for generating a second wireless field may be provided by the second antenna array 720 of FIG. 7.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power transmission device, the device comprising:
    a driver circuit configured to generate first and second driver signals;
    a first antenna array of antenna coils configured to generate a first wireless field based on the first driver signal powering the first antenna array such that adjacent antenna coils of the first antenna array are powered with opposite polarities; and
    a second antenna array of antenna coils partially overlapping the first antenna array, the second antenna array configured to generate a second wireless field orthogonal to the first wireless field, the second wireless field generated based on the second driver signal powering the second antenna array such that adjacent antenna coils of the second antenna array are powered with opposite polarities.

2. The device of claim 1, wherein the first antenna array overlaps the second antenna array with an offset such that the first antenna array is substantially magnetically decoupled from the second antenna array.

3. The device of claim 1, wherein the antenna coils of the first antenna array are substantially coplanar, and wherein the antenna coils of the second antenna array are substantially coplanar.

4. The device of claim 1, wherein the first and second drive signals have periodic waveforms, wherein the first drive signal has about 90 degree phase shift with respect to the second drive signals such that the first wireless field has about 90 degree phase shift with respect to the second wireless field.

5. The device of claim 1, wherein the first and second antenna arrays are configured to generate the first and second wireless fields in a first direction.

6. The device of claim 1, wherein the antenna coils of the first antenna array are formed from a first electrically connected winding, and wherein the antenna coils of the second antenna array are formed from a second electrically connected winding.

7. The device of claim 1, wherein the first antenna array comprises two or more of the antenna coils, and wherein the second antenna array comprises two or more of the antenna coils.

8. The device of claim 1, wherein two or more of the antenna coils of the first antenna array are configured to wirelessly couple if the first antenna array is powered, and wherein two or more of the antenna coils of the second antenna array are configured to wirelessly couple if the second antenna array is powered.

9. The device of claim 1, wherein adjacent antenna coils of the first antenna array are configured to carry current in opposite rotational directions.

10. The device of claim 1, wherein adjacent antenna coils of the first antenna array are configured to carry current in opposite rotational directions, and wherein adjacent antenna coils of the second antenna array are configured to carry current in opposite rotational directions.

11. The device of claim 1, wherein the first antenna array includes at least two rows of antenna coils and at least two columns of antenna coils, wherein the second antenna array includes at least two rows of antenna coils and at least two columns of antenna coils.

12. The device of claim 1, further comprising a charging pad including the first and second antenna arrays and the driver circuit, wherein the charging pad has a length greater than about ten inches and a width greater than 6 inches, wherein the charging pad is configured to generate a combined wireless field of the first and second wireless field at a power level greater than about 30 Watts, wherein the combined wireless field substantially decays at least by a distance from the charging pad of at least one of about half the length of the charging pad or about half of the width of the charging pad.

13. A method for wireless power transmission, the method comprising:
generating first and second drive signals;
generating a first wireless field via a first antenna array of antenna coils by powering the first antenna array based on the first driver signal, powering the first antenna array comprising powering adjacent coils of the first antenna array with opposite polarities; and
generating a second wireless field orthogonal to the first wireless field via a second antenna array of antenna coils by powering the second antenna array based on the second driver signal, the first antenna array at least partially overlapping the second antenna array, powering the second antenna array comprising powering adjacent coils of the second antenna array with opposite polarities.

14. The method of claim 13, wherein the first antenna array overlaps the second antenna array with an offset such that the first antenna array is substantially magnetically decoupled from the second antenna array.

15. The method of claim 13, wherein the first and second drive signals have periodic waveforms, wherein the first drive signal has about 90 degree phase shift with respect to the second drive signals such that the first wireless field has about 90 degree phase shift with respect to the second wireless field.

16. The method of claim 13, wherein adjacent antenna coils of the first antenna array are configured to carry current in opposite rotational directions, and wherein adjacent antenna coils of the second antenna array are configured to carry current in opposite rotational directions.

17. An apparatus for wireless power transmission, the apparatus comprising:
means for generating first and second driver signals;
a plurality of means for generating a first wireless field based on the first driver signal powering the plurality of first wireless field generating means such that adjacent means of the plurality of first wireless field generating means are powered with opposite polarities; and
a plurality of means for generating a second wireless field orthogonal to and at least partially overlapping the first wireless field, the second wireless field based on the second driver signal powering the plurality of second wireless field generating means such that adjacent means of the plurality of second wireless field generating means are powered with opposite polarities.

18. The apparatus of claim 17, wherein the plurality of first wireless field generating means is substantially magnetically decoupled from the plurality of second wireless field generating means.

19. The apparatus of claim 17, wherein the first and second drive signals have periodic waveforms, wherein the first drive signal has about 90 degree phase shift with respect to the second drive signals such that the first wireless field has about 90 degree phase shift with respect to the second wireless field.

20. The apparatus of claim 17, wherein adjacent means of the plurality of first wireless field generating means are configured to carry current in opposite rotational directions, and wherein adjacent means of the plurality of second wireless field generating means are configured to carry current in opposite rotational directions.

* * * * *